United States Patent
Son et al.

(10) Patent No.: US 7,634,796 B2
(45) Date of Patent: *Dec. 15, 2009

(54) METHOD AND APPARATUS PROVIDING PROCESS INDEPENDENCE WITHIN A HETEROGENEOUS INFORMATION DISTRIBUTION SYSTEM

(75) Inventors: Yong Ho Son, Palo Alto, CA (US); Michael Robert Colligan, Sunnyvale, CA (US)

(73) Assignee: Cox Communications, Inc., Atlanta, GA (US)

( * ) Notice: Subject to any disclaimer, the term of this patent is extended or adjusted under 35 U.S.C. 154(b) by 553 days.

This patent is subject to a terminal disclaimer.

(21) Appl. No.: 11/134,902

(22) Filed: May 23, 2005

(65) Prior Publication Data

US 2006/0064728 A1   Mar. 23, 2006

Related U.S. Application Data

(63) Continuation of application No. 09/458,321, filed on Dec. 10, 1999, now Pat. No. 6,898,800.

(60) Provisional application No. 60/127,124, filed on Mar. 31, 1999.

(51) Int. Cl.
    H04N 7/173   (2006.01)
(52) U.S. Cl. .......................... 725/86; 725/61; 725/87; 725/105; 725/114; 725/115; 709/219; 709/228
(58) Field of Classification Search .............. 725/60, 725/61, 86, 87, 105, 114, 115; 709/219, 709/228
    See application file for complete search history.

(56) References Cited

U.S. PATENT DOCUMENTS

| | | | |
|---|---|---|---|
| 6,005,565 A | 12/1999 | Legall et al. | |
| 6,011,918 A | 1/2000 | Cohen et al. | |
| 6,044,408 A | 3/2000 | Engstrom et al. | |
| 6,049,333 A | 4/2000 | LaJoie et al. | |
| 6,088,051 A | 7/2000 | Barraud | |
| 6,104,392 A * | 8/2000 | Shaw et al. | 715/749 |
| 6,133,937 A | 10/2000 | VanGestel | |
| 6,167,044 A | 12/2000 | De Vos et al. | |
| 6,191,786 B1 | 2/2001 | Eyzaguirre et al. | |
| 6,195,677 B1 * | 2/2001 | Utsumi | 709/201 |
| 6,594,699 B1 * | 7/2003 | Sahai et al. | 709/228 |
| 6,788,710 B1 * | 9/2004 | Knutson et al. | 370/535 |
| 6,898,800 B2 * | 5/2005 | Son et al. | 725/93 |

FOREIGN PATENT DOCUMENTS

JP   11-163817   6/1999

* cited by examiner

*Primary Examiner*—John W Miller
*Assistant Examiner*—Sumaiya A Chowdhury
(74) *Attorney, Agent, or Firm*—Merchant & Gould

(57) ABSTRACT

A method and apparatus for adapting the delivery of assets and/or content to set top terminals within a heterogeneous information distribution system based on graphics and/or processing capability of set top terminals receiving the assets and/or content.

16 Claims, 3 Drawing Sheets

METHOD AND APPARATUS PROVIDING PROCESS INDEPENDENCE WITHIN A HETEROGENEOUS INFORMATION DISTRIBUTION SYSTEM

CROSS REFERENCE TO RELATED APPLICATIONS

This application is a continuation of U.S. patent application Ser. No. 09/458,321, filed on Dec. 10, 1999, now U.S. Pat. No. 6,898,800 which application claims benefit of U.S. Provisional Patent Application Ser. No. 60/127,124, filed on Mar. 31, 1999; both prior applications are incorporated herein by reference in their entireties.

BACKGROUND OF THE INVENTION

1. Field of the Invention

The present invention relates to a heterogeneous information distribution system such as a video-on-demand (VOD) system. More particularly, the present invention relates to a method and apparatus for processing content and other assets such that each set top terminal (STT) receives at least an asset data stream adapted to the maximal capabilities of the respective STT.

2. Description of the Background Art

Information distribution systems, such as video on demand (VOD) systems providing content encoded according to the various Moving Pictures Experts Group (MPEG) standards are known. For example, a first standard known as MPEG-1 refers to ISO/IEC standards 11172, which is incorporated herein by reference in its entirety. A second standard known as MPEG-2 refers to ISO/IEC standards 13818, which is incorporated herein by reference in its entirety. Additionally, a compressed digital video system is described in the Advanced Television Systems Committee (ATSC) digital television standard document A/53, incorporated herein by reference in its entirety.

An interactive information distribution system provided by DIVA Systems Corporation of Redwood City, Calif. is described in more detail in U.S. Pat. No. 6,253,375, issued Jun. 26, 2001 and incorporated herein by reference in its entirety. Users or subscribers to the DIVA system select information offerings using a "Navigator" functionality, which is described in more detail in U.S. Pat. No. 6,208,335, issued Mar. 27, 2001 and incorporated herein by reference in its entirety. Briefly, the Navigator utilizes a combination of MPEG content (such as MPEG video content and related MPEG audio content) and Navigator asset data to provide viewers with a means of selecting and ordering services. Navigator assets include bitmaps and navigation control scripts. As the set top box user is "navigating," the set top box extracts the asset data from a transport stream including video content and asset data and uses that data to provide bitmap overlays on top of the MPEG content. The control data within the asset data is used to define the layout of the screen and to take actions based on viewer input.

Unfortunately, within the context of an information distribution system utilizing set top terminals (STTs) or set top boxes (STBs) of differing levels of capability (a heterogeneous system), possibly from different manufacturers, asset data suitable for use by one model (e.g., a high capability) set top terminal will not be usable by another model (e.g., a low capability) set top terminal.

Therefore, it is seen to be desirable to provide a method and apparatus for adapting the delivery of assets and/or content to set top terminals within a heterogeneous information distribution system such that a maximal level of capability for each STT is utilized. Moreover, it is seen to be desirable to adapt the delivered assets in a manner tending to avoid additional processing by the STT, such as decoding multiple layers of asset data to retrieve an appropriate layer.

SUMMARY OF THE INVENTION

The disadvantages heretofore associated with the prior art are overcome by the present invention of a method and apparatus for adapting the delivery of assets and/or content to set top terminals within a heterogeneous information distribution system based upon graphics, bandwidth and/or processing capabilities of the set top terminals receiving the assets and/or content.

BRIEF DESCRIPTION OF THE DRAWING

The teachings of the present invention can be readily understood by considering the following detailed description in conjunction with the accompanying drawing, in which.

To facilitate understanding, identical reference numerals have been used, where possible, to designate identical elements that are common to the figures.

DETAILED DESCRIPTION

While the invention will be primarily described within the context of a heterogeneous interactive information distribution system, it should be noted that the invention may be advantageously adapted to any system including information receivers having a plurality of capability levels.

Figure 1:
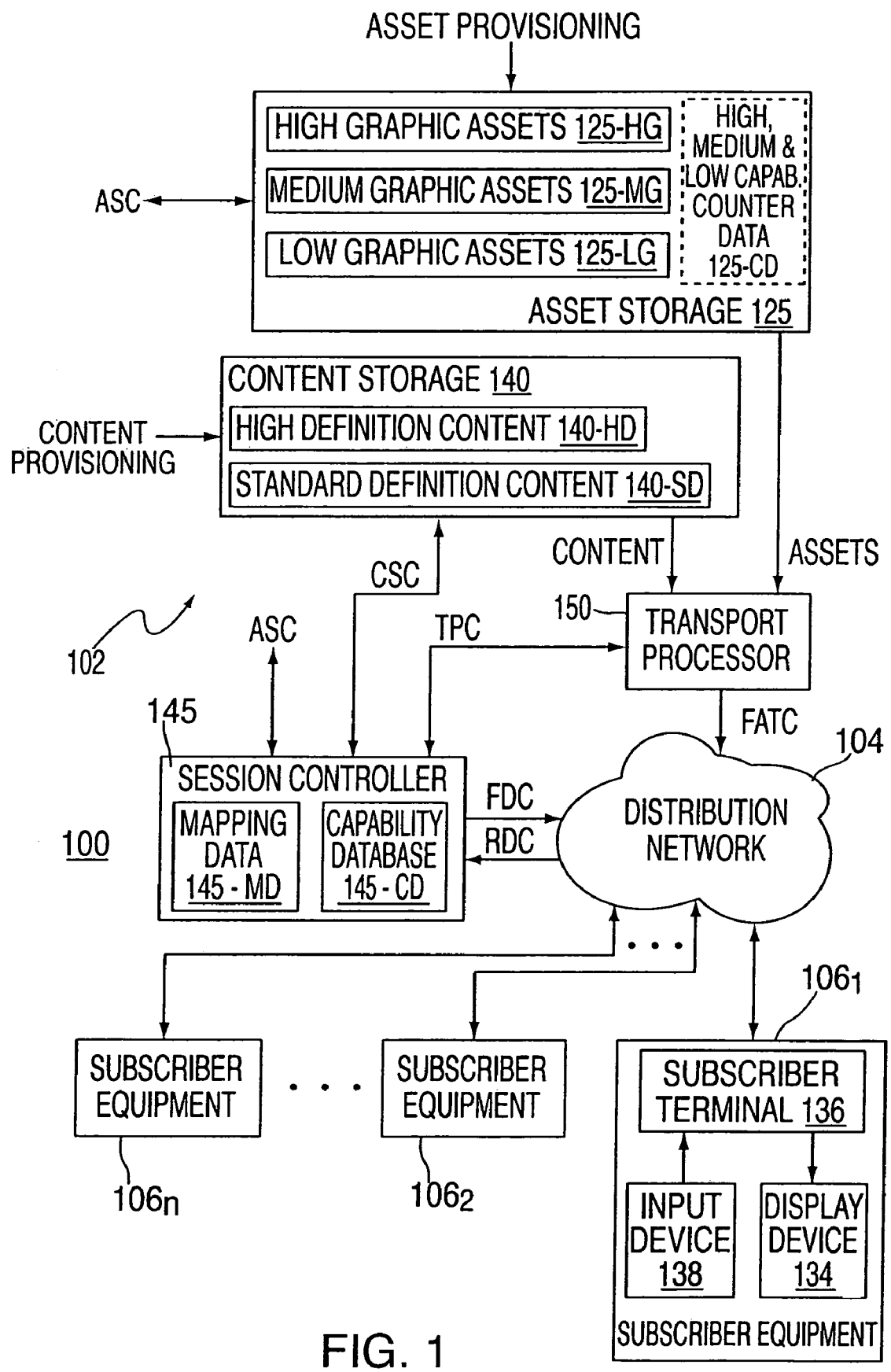
FIG. 1 depicts a high-level block diagram of an interactive information distribution system.

FIG. 1 depicts a high-level block diagram of an interactive information distribution system. Specifically, FIG. 1 depicts a high-level block diagram of an interactive information distribution system 100 containing the present invention. The system 100 contains service provider equipment 102, a distribution network 104 and subscriber equipment 106.

The system 100 of FIG. 1 is a heterogeneous system in that subscriber equipment 106 may comprise subscriber terminals, also known as set top terminals (STTs) and set top boxes (STBs), of differing capability with respect to control processing, bandwidth and/or graphics processing. Within such a system each of the set top terminals receiving information streams from a server or head-end includes at least a basic or minimal level of functionality. Such minimal level of functionality may comprise, for example, the ability to decode an MPEG-2 transport stream including video information (and associated audio information) and process the decoded video (and associated audio information) to produce video (and audio) streams or signals suitable for use by a presentation device. However, some set top terminals may have a very high level of graphics processing capability and/or control capability, while others may have a much lower level of functionality.

The distribution network 104 may comprise one or more of a Hybrid Fiber Coax (HFC) for cable, Plain Old Telephone System (POTS) for ADSL, terrestrial broadcast system like MMDS or LMDS, or satellite distribution system like DBS. The bandwidth available for delivery of configuration, control, and content data is statically allocated per set top terminal or dynamically allocated based on demand and usage. Specifically, based on the bandwidth constraints placed on a STT, the appropriately sized content data, for example, is determined by the session controller 145 upon the receiving of a request from the subscriber 106. This appropriately sized content data for the allocated bandwidth is requested from the content storage 140 (or asset storage 125) by session controller 145 and rated to the transport processor 150 in a manner conforming to the limited bandwidth allocated for the requesting STT and, optionally, the distribution network 104.

The service provider equipment 102 comprises an asset storage module 125, a content storage module 140, a session controller 145 and a transport processor 150. Briefly, the session controller 145, in response to a request from subscriber equipment 106, causes requested content to be retrieved from the content storage module 140 and provided to the transport processor 150. Additionally, any assets associated with the requested content are provided by the asset storage module 125 to the transport processor 150. The transport processor 150 combines or multiplexes the content and asset data to provide an output data stream for the requesting subscriber. The output data stream for the requesting subscriber is coupled to that subscriber via a forward application transport channel (FATC) within the distribution network 104.

The content storage module 140 is used to store content such as movies, television programs and other information offerings of the interactive information distribution system 100 of FIG. 1. While the content may be stored in several forms, such as unencoded, encoded and unpacketized, encoded and packetized, encrypted and the like, the preferred method is to store each content stream as an MPEG-2 transport stream including a plurality of NULL packets.

The asset storage module 125 is used to store assets such as bit map text or imagery, graphic overlay, control scripts and the like. The assets may comprise, for example, Navigation assets that are used by a set top terminal to interactively navigate, and select for viewing, the offerings or content available from the information distribution system 100. To form a navigator "applet," navigator content data and related navigator asset data are "mapped" together to form a multiplexed content/asset data transport stream suitable for implementing the navigation function. While the assets may be stored in several forms, such as unencoded, encoded and unpacketized, encoded and packetized and the like, the preferred method is to store such assets as MPEG-2 transport packets. In this manner asset packets may be inserted into a content transport stream being formed, or multiplexed into a content transport stream.

Specifically, in the preferred embodiment of the invention, the asset data transport stream ASSETS includes a plurality of transport packets carrying asset data while the content data transport stream CONTENT includes a plurality of NULL transport packets interspersed with content transport packets. The interspersed NULL packets "reserve" a portion of the content data stream sufficient to accommodate the asset data packets within the asset data stream ASSETS. The service provider equipment 102, in response to a subscriber request for a content stream, provides a version of the requested content stream in which some or all of the NULL packets have been replaced by asset data packets. In this manner, the service provider equipment 102 is able to adapt the asset data provided to a subscriber without reprocessing the content data. Thus, bandwidth and processing capabilities are utilized efficiently without causing "over-utilization" errors.

The session controller 145 (or session manager) provides session control of the information flowing to and from the content 140 and asset 125 storage modules, and may be generally described as a system providing or controlling communications between, e.g., a cable system head-end and one or more set top terminals. The session controller 145 produces an asset storage control signal ASC for controlling and communicating with the asset storage module 125, a content storage control signal CSC for controlling and communicating with the content storage module 140, and a transport processor control signal TPC for controlling and communicating with the transport processor 150.

The session controller 145 communicates with the asset storage module 125 and content storage module 140 to determine appropriate mapping of content streams or files stored on the content storage module 140 to asset streams or files stored on the asset storage module 125. This mapping information is stored within the mapping data memory portion 145-MD of the session controller 145.

The session controller 145 includes a capability data base 145-CD that is used to store information defining the graphic and, optionally, control capability of each type of subscriber equipment 106 utilized within the interactive information distribution system 100 of FIG. 1. This database may be defined in terms of the manufacturer or model number of a STT, the chipset(s) used in the STT, or other information suitable for defining such capability. All that is necessary is that the session controller 145 is able to determine the graphics and, optionally, control or bandwidth capability of the distribution network, a set top terminal, or other subscriber equipment requesting content and/or asset information.

The asset storage module 125 communicates with the session controller 145 via an asset control signal (ASC) provided by the session controller 145. The asset storage module 125 includes a high graphic asset module 125-HG, a medium graphic asset storage module 125-MG, and a low graphic asset storage module 125-LG. These storage modules are used to store, respectively, high (125-HG), medium (125-MG) and low (125-LG) graphic versions of each of the assets including graphic information. The asset storage module 125, in response to the asset storage control signal (ASC), outputs an appropriate high, medium or low graphic version of a requested asset to the transport processor 150 via the signal path ASSETS. The operation of the session controller 145 will be discussed in more detail with respect to FIG. 3. Briefly, in response to a subscriber request indicative of a need for asset data, the session controller 145 determines a graphic capability of the requesting subscriber and causes the asset storage module 125 to provide, to the transport processor 150, those stored assets appropriate to the determined graphics capability of the requesting subscriber equipment.

Optionally, asset storage module 125 includes high, medium, and low capability control data 125-CD. As with the high, medium and low graphic asset data (125-HG, -MG and -LG), the asset storage module 125 is responsive to the asset storage control signal ASC to provide control data appropriate to the control processing capability of the requesting subscriber equipment. It should be noted that while the level of graphic processing capability of subscriber equipment tends to be proportional to the level of control processing capability, this does not need to be the case. Therefore, a high graphic asset 125-HG may be associated with, for example, low control data capabilities, a low graphic asset 125-LG may be associated with high control data capabilities and so on. The capability database 145-CD of the session controller 145 includes, in the optional embodiment of adapting control data, capability information pertaining to control capability of each type of subscriber equipment utilized within the interactive information distribution system 100 of FIG. 1.

In response to a user request for particular content, the session controller 145 causes the requested content file to be streamed to the transport processor 150. Additionally, the session controller 145 utilizes the mapping data 145-MD to determine which asset data stream or file (if any) is associated with the requested content stream or file. The session controller 145 causes the associated asset stream or file to be streamed to the transport processor 150 from the asset storage module 125.

The session controller 145 sends data, such as commands, encryption keys and the like to set top boxes via a forward data channel (FDC). The session controller 145 receives data, such as information stream requests and session initiation data (set top identification, capability, and the like) via a reverse data channel (RDC). The FDC and RDC are supported by the distribution network 104 and comprise relatively low bandwidth data channels, such as 1-2 megabits per second data channels utilizing QPSK, QAM or other modulation techniques. The FDC and RDC are also known as "out of band" channels, while a relatively high bandwidth forward application transport channel (FATC) is also known as an "in-band" channel. The session controller 145 contains an interface device for sending control information via the forward data channel FDC and receiving control information via the reverse data channel RDC using so-called "out of band" carrier frequencies.

The transport processor 150 accomplishes all of the forward content channel transmission interface requirements of the system 100 of FIG. 1. Specifically, the transport processor 150 is coupled to subscriber equipment via the forward applications transport channel (FATC). The forward application transport channel (FATC) is supported by the distribution network 104 and comprises a relatively high bandwidth communications channel well suited to carrying video, audio and data such as, for example, multiplexed MPEG-2 transport packets. It should be noted that data normally conveyed to a set top box via the FDC may be included in the FATC data stream.

The transport processor 150 contains a multiplexer or combiner for multiplexing or combining the content information stream CONTENT provided by content storage module 140 and the asset information stream ASSETS provided by asset storage module 125. Within the context of the preferred embodiment, the transport processor 150 detects NULL packets within the content stream CONTENT, and replaces some or all of those NULL packets with asset packets from the asset stream ASSETS to form a combined CONTENT and ASSET stream. The transport processor 150 also contains a modulator for modulating the combined content and asset stream onto one or more carrier frequencies for transmission on the FATC, the so-called "in band" carrier frequencies. The transport processor 150 also inserts required system information (SI) and program specific information (PSI) packets into the multiplexed stream. These packets are generated based on the content in the multiplex.

The distribution network 104 can be any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams.

In general, the transport mechanism for forward and reverse data channels that transport information to and from the set top terminal must be able to carry unidirectional, asynchronous packetized data such as that defined in the MPEG video and audio signal transmission protocol, and the like. There are a number of such transport protocols available.

The subscriber equipment 106 comprises a set top terminal or set top box 136, a display device 134 (e.g., a conventional television) and a user input device 138 (e.g., a remote control). Each set top terminal 136 receives the data streams from the FATC, demodulates the received data streams and, in the case of video streams, processes the demodulated video streams for subsequent display on the display device 134. In addition, the set top terminal 106 accepts commands from the remote control input device 138 or other input device. These commands are formatted, modulated, and transmitted through the distribution network 104 to the session controller 145. Typically, this transmission is accomplished through the RDC. These commands are preferably transmitted through the same network used to transmit information to the set top terminal. However, the RDC coupling the set top terminal to the server may be a separate network, e.g., a FATC through a television cable network and a RDC through a telephone network. The telephone network could also support the FDC.

The subscriber equipment 106 depicted in the interactive information distribution system 100 of FIG. 1 comprises subscriber terminals 136 having predefined levels of capability in terms of graphic processing bandwidth and/or control processing. The subscriber equipment 106 may comprise different models of set top terminals, produced by the same or by different set top terminal manufacturers. The capability of a set top terminal 136 depends upon several factors, such as the amount of memory within the set top terminal, the amount of processing power within the set top terminal, the methodology of user interaction (i.e., the control paradigm) used by the set top terminal to respond to viewer interaction via the input device 138, and other factors. For example, it is anticipated that as time goes by an existing installed base of set top terminals may still be serviceable within the context of the information distribution system 100 of FIG. 1, but that newer set top terminals having greater capabilities will be installed within that system and that those capabilities should be fully utilized. In this manner, consumers are encouraged to upgrade in terms of both hardware capability and service selection to enjoy more feature-rich experiences and greater ease of use.

With respect to bandwidth capability, some set top terminals are able to acquire and process information very rapidly from the forward data channel FDC and forward applications transport channel FATC, while other set top terminals are not. Additionally, some set top terminals are only able to process QPSK modulated information, while other set top terminals may process QPSK, BPSK and QAM modulated signals. Thus, in the case of a set top terminal having a high bandwidth capability, or having the capability to process data transmitted by higher efficiency modulation techniques, the forward data channel FDC and/or forward application transport channel FATC may be utilized more efficiently in that the amount of time used to service such high bandwidth capability set top terminals is reduced, thereby providing more bandwidth for the rest of the system.

The session controller 145 interprets each command sent from the set top terminal through the RDC and adapts other functional elements (e.g., the storage modules) in response to the subscriber request (e.g., send a requested movie and associated asset data).

Session control commands, such as navigation commands, are implemented by the session controller 145 with the set top terminal 136. Each command is implemented by the execution of an applet by the set top terminal 136. The applet is stored in the provider equipment (e.g., in asset storage module 125), and is transmitted to the set top terminal 136 (via the FDC or FATC) by the session controller 145 in response to requests transmitted by the set top terminal 136 (via the RDC). It is noted that each applet includes links to other applets stored within the provider equipment 102. In this manner, the server-centric topology provides for the conservation of set top terminal memory, processing capabilities and bandwidth.

It should be noted that each applet comprises control information, graphics information and video information. The video information is derived from video asset data, the control information is derived from control asset data, and the graphics information is derived from graphics (and textual) asset data. The video asset data, control asset data and graphics asset data are stored in the asset storage module 125. It will be appreciated by those skilled in the art that such asset data may be stored in other storage means within the information provider equipment 102. The graphics asset data is stored as high graphic asset 125-HG, medium graphic asset 125-MG and low graphic assets 125-LG. While three levels of resolution or quality (high, medium and low) are depicted, it will be appreciated by those skilled in the art that many more levels of quality or resolution may be utilized to further adapt the quality of the graphic data presented to a viewer to the capability of the viewer's STT to present that graphic data. Similarly, the asset storage module 125 optionally includes high, medium and low capability control data 125-CD. It will be further appreciated by those skilled in the art that control data of many other levels of capability may also be stored in the asset storage module 125.

The applets control both information sessions, such as the presentation of video to the television screen, and navigator functions, such as menus facilitating selection of a video program. As such, particular commands include, but are not limited to, information or menu navigation commands, movie start at beginning, movie start at the middle, play, stop, rewind, forward, pause, and the like. The graphical data and other asset data used to provide the user interface at the set top terminal 136 comprises asset data, such as navigator asset data that is processed by the service provider equipment 102 of the present invention.

The subscriber equipment 106 depicted in FIG. 1 is assumed to include a common capability in terms of processing video information streams and associated audio information streams. However, in one embodiment of the invention, in addition to differing capability levels with respect to graphics and/or control information, the set top terminals or subscriber equipment 106 within the system 100 of FIG. 1 also have different capabilities in terms of video information. That is, a "bare bones" set top terminal may only be capable of processing video information of a certain format (e.g., standard definition television) while other set top terminals may be capable of processing video information of varying formats (high definition television and/or standard definition television). It is noted that in a heterogeneous information distribution system, STT capability varies with respect to graphics, control, bandwidth and/or video processing functions. While this variation in capability typically does not affect a primary function such as decoding video information streams, it is contemplated by the inventors that such variations are possible and, therefore, such variations are taken into account in the present invention.

A content development facility (not shown) receives encoded content from, for example, a content encoding facility (not shown) where Navigation assets and/or other assets are developed or aggregated. The content development facility (CDF) formats the content and assets into, for example, MPEG-2 transport stream files and distributes the resultant files as appropriate to the asset storage module 125 via a first provisioning stream ASSET PROVISIONING and to the content storage module 140 via a second provisioning stream CONTENT PROVISIONING. The CDF functions in a CDF that is physically remote from the system 100 of FIG. 1 The CDF function may also be performed prior to the actual need for the assets and/or content. Assets, such as the aforementioned Navigator assets, are typically packaged as MPEG transport packets that are multiplexed along with content-representative MPEG packets to produce a single MPEG transport stream file. The file is then transported to and stored on each of, possibly, many servers for subsequent transmission to the users' set top boxes.

The STT capability can also vary in the format of the content it can display or process, for example, MPEG-2, or MPEG-4 or MPEG-1. The invention stores this capability information in the capability database 145-CD, and appropriate capability level streams in content storage 140. Only content which can be displayed or processed by the STT is provided to the STT. Based on the same capability, information presented to the subscriber of the choices of content available, e.g. movies, will be limited by this STT capability. For example, a STT only capable of displaying MPEG-1 movies will only be shown an MPEG-1 movies list.

Figure 2:
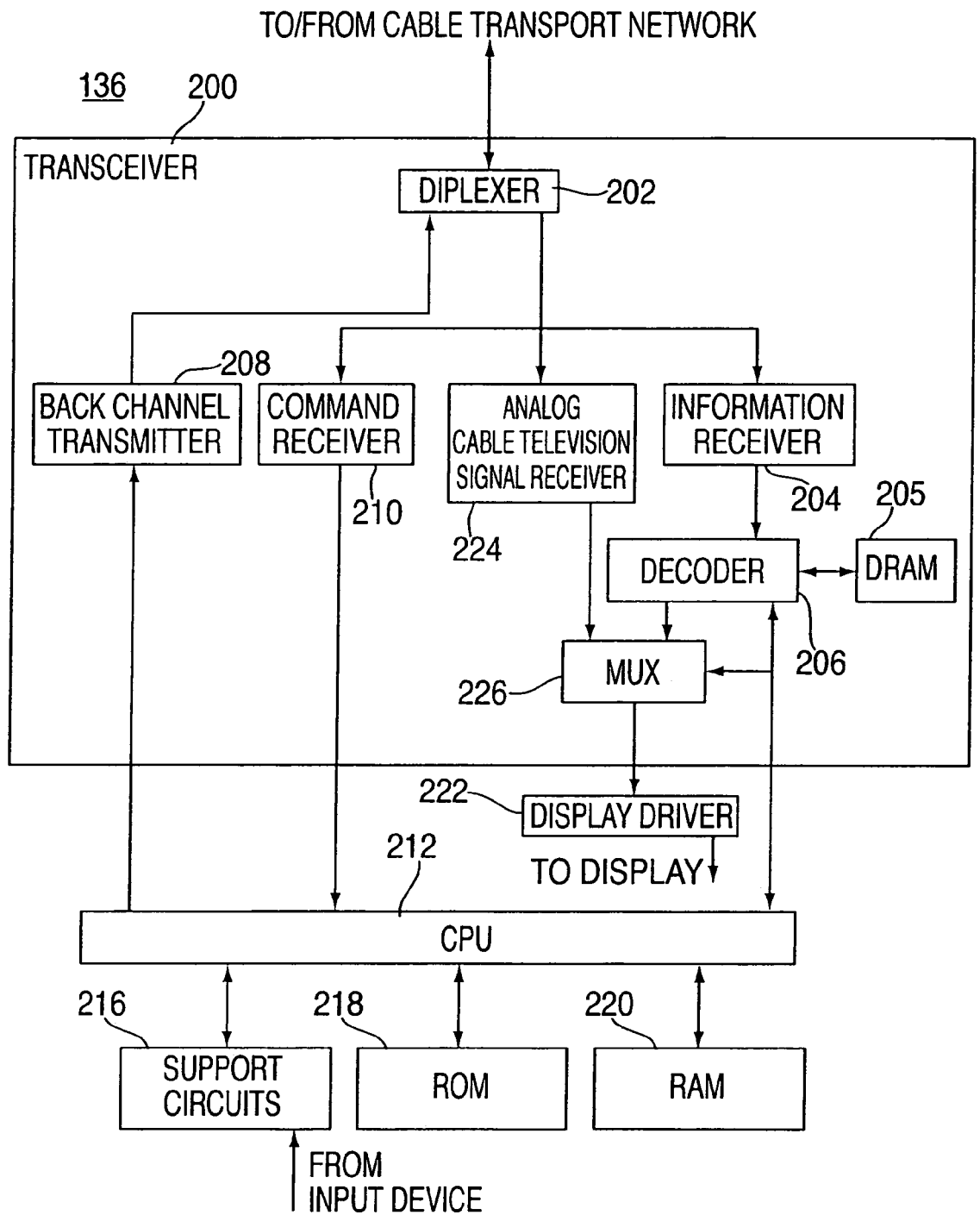
FIG. 2 depicts a high level block diagram of a subscriber terminal suitable for use in the interactive information distribution system of FIG. 1.

FIG. 2 depicts a high-level block diagram of a set top terminal suitable for use in the interactive information distribution system of FIG. 1. Specifically, FIG. 2 depicts a high level block diagram of a STT 136 which contains a transceiver 200, a central processing unit (CPU) 212 and a display driver 222. Of course, the functionality of the set top terminal 136 can be embedded within a single consumer electronics product such a television. As such, the description of a stand-alone set top terminal should be considered illustrative of the type of subscriber equipment that may be used to implement the present invention. Within the set top terminal 136, the CPU 212 is supported by random access memory (RAM) 220, read only memory (ROM) 218 and various support circuits 216 such as clocks, power supply, an infrared receiver and the like. The transceiver 200 contains a diplexer 202, a back channel transmitter 208, an information channel receiver 204, a command channel receiver 210, an information decoder 206, a conventional television signal receiver 224, and a multiplexer 226. The diplexer 202 couples the three channels carried by a single cable within the network to the transmitter and receivers.

Each receiver 204 and 210 contains a tuner, amplifiers, filters, a demodulator, and a depacketizer. As such, the receivers tune, downconvert, and depacketize the signals from the cable network in a conventional manner. The information channel receiver 204 contains a conventional QAM demodulator such as a model BCM3115 manufactured by the Broadcom Corporation. Other such demodulators are well known in the communications arts and could be used in this application. However, this particular demodulator also contains a built in "out-of-band" QPSK demodulator for handling command channel data carried by the forward data channel. As such, a single integrated circuit demodulates both subscriber-requested information (audio and video) as well as command data.

The decoder 206 processes the data packets carrying subscriber requested information produced by the QAM demodulator into useable signals for the end user display, e.g., television, home studio, video recorder and the like. The decoder 206 is coupled to a dynamic random access memory (DRAM) 205 to facilitate decoding of the data packets and processing of applets, as shall be discussed below. The signals for display are conventionally processed by a display driver 222 to produce a video signal suitable for use by the display device 134.

The conventional cable television signal receiver 224 contains a tuner and an analog (NTSC) demodulator. A multiplexer 226 couples the demodulated analog or decoded video signal to the display drive 222. Of course, the NTSC demodulator can be replaced with a PAL or SECAM standard demodulator, as needed.

The demodulated QPSK signal provides command and control information to the CPU 212 for generating certain graphics and control interface regions upon a television screen. The CPU is, for example, a Model 68302 processor manufactured by Motorola. This processor, operating in combination with the decoder 206 as well as a continuously available video signal from the information channel, produces screen displayed buttons, icons and graphical regions with which a subscriber interacts using the remote control. Without the video signal the set top terminal does not produce any display, i.e., the displays are actively generated in real time as needed to facilitate certain navigation functions.

Once downloaded, a graphic bit map may be reused on different display screens. In other words, the bit map graphics are persistent to the set top terminal. As such, these graphic bit maps need not be retransmitted to the set top terminal. Persistent assets are limited by the amount of memory within the set top terminal. Also, some of the images (bit maps) are built into the executable code within the set top terminal and are not downloaded in the normal manner. These built in bit maps may be displayed in the absence of video (i.e., during session start up and tear down situations). The executable code may be hard coded into the set top terminal or may be transmitted as part of a raw data stream or other control data stream from the service provider equipment 102.

Specifically, a joystick on the remote control selectively highlights certain pre-defined regions of the television screen. To perform such highlighting, a reference region is always highlighted when a menu is first displayed. From that reference region, direction vectors produced by the joystick are interpreted by the CPU to highlight a region lying in the direction in which the joystick was moved. When a desired selectable icon is highlighted, the subscriber depresses a "select" key on the remote that sends an infrared signal to an infrared receiver (a support circuit 216). This receiver sends the select command to the CPU for interpretation. The selected region is associated with a function. If the function is a request for specific information or a change in the menu, the processor formats the command and sends it to the back channel transmitter for transmission to the video session manager. If the command is a function that is handled locally such as volume control, the CPU implements the function within the set top terminal.

Since the session control commands are implemented by the video session manager and not the set top terminal alone, the number of available session control commands is infinite. Each command is implemented by the execution of an applet, as described below. The applets control both information sessions, e.g., the presentation of video to the television screen, and navigator functions, e.g., the menus that facilitate selection of a video program. As such, particular commands include, but are not limited to, information or menu navigation commands, movie start at beginning, movie start at the middle, play, stop, rewind, forward, pause, and the like. These presentation and navigation control commands are sent via a back channel transmitter 208 using binary phase shift key (BPSK) modulation quadrature phase shift key (QPSK) or quadrature amplitude modulator (QAM). Additionally, the CPU in the set top terminal implements certain local commands such as increment or decrement the volume, channel change, and on/off.

Figure 3:
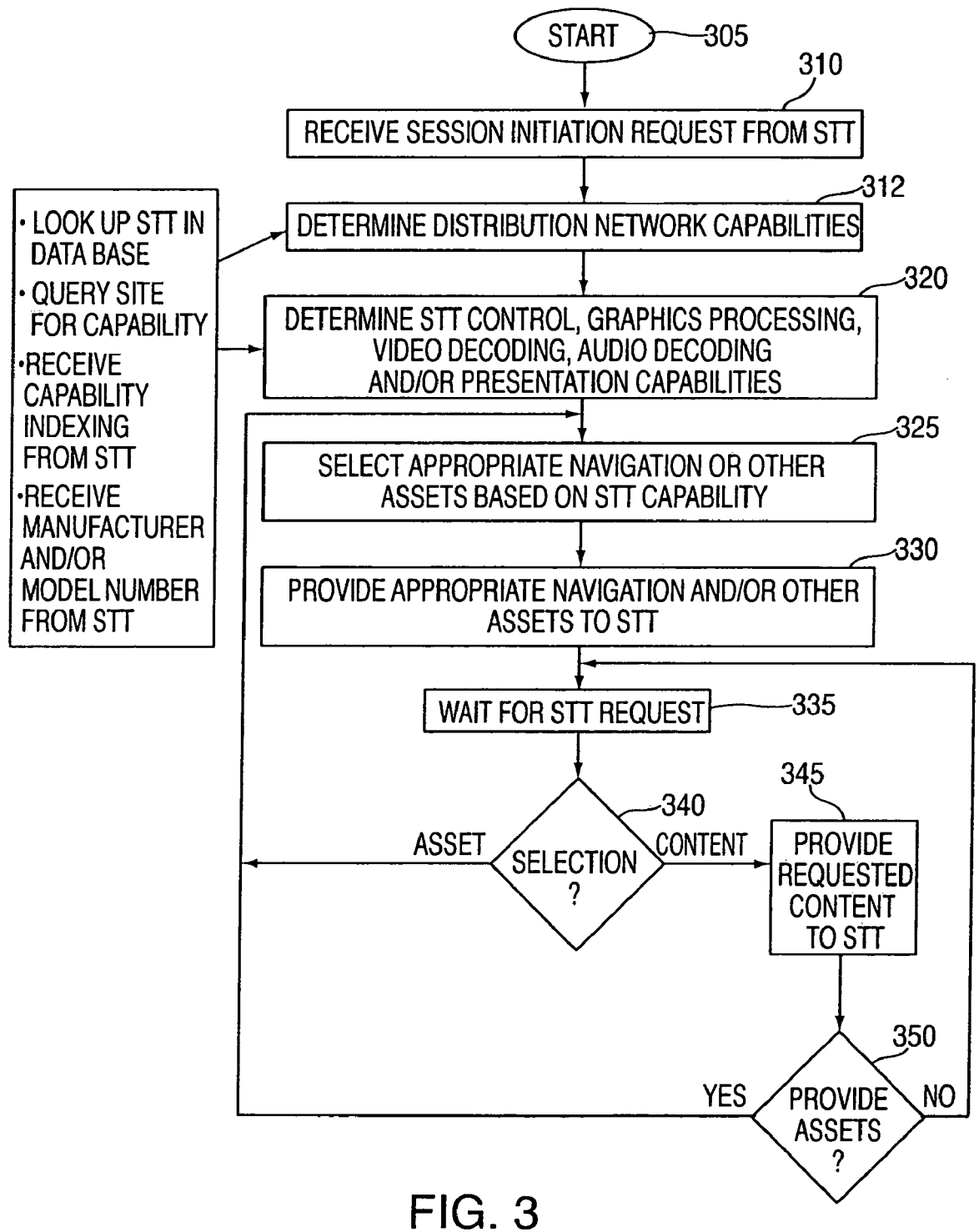
FIG. 3 depicts a flow diagram of a method for delivering capability-appropriate asset and/or content data to a set top terminal and suitable for use in the interactive information distribution system of FIG. 1.

FIG. 3 depicts a flow diagram of a method for delivering capability appropriate asset and/or content data to a set top terminal. The method 300 of FIG. 3 is suitable for use, for example, in the service provider equipment 102 of the interactive information distribution system 100 of FIG. 1.

The method 300 is entered at step 305 and proceeds to step 310, where the service provider equipment 102 receives a session initiation request from a set top terminal within the system. The service provider equipment 102 establishes a session with the requesting set top terminal in the standard manner (providing the STT with appropriate control information, encryption/decryption information, identification of logical and physical channels for transporting information to the set top terminal and the like). The method 300 then proceeds to step 312.

At step 312, the capability of the distribution network 104 is determined. That is, the type of network (e.g. HFO, POTS, ATSC, DBS, etc., used to communicate requested content to the subscriber is determined such that content and/or asset data provided to the subscriber does not require more than the available amount of bandwidth. The method 300 then proceeds to step 320.

At step 320 the set top terminal control, graphics processing, video decoding, audio decoding and/or presentation capabilities is determined. This determination (and the distribution network determination made above with respect to step 312) is made with respect to at least the factors identified in box 315. That is, the determination of the set top terminal capability or distribution network capability is defined by looking up the set top terminal in the capability data base 145-CD, querying the set top terminal to provide capability information directly (e.g., graphics level, memory level, processor used and the like), receiving a capability indicator from the STT or receiving a manufacturer and/or model number from the STT. All that is necessary is that an appropriate graphic, bandwidth and/or control capability of the STT is established such that appropriate graphic assets and, optionally, control data may be provided to the STT for navigation and other purposes. With respect to bandwidth limitations, the graphic assets and, optionally control data are provided to the STT using a maximally efficient modulation method or at a bit rate adapted to the capabilities of the set top terminal. The bit rate is, of course, selected such that the received buffers of the set top terminal are not overflowed. Thus, in the case of a set top terminal having increased memory size, a higher bit rate may be supported during burst mode operations. The method 300 then proceeds to step 325.

At step 325, navigation or other assets that are appropriate to the set top terminal based upon the determined set top terminal capability are selected. That is, in the case of navigation assets, the video information normally associated with the navigation screen is provided along with high graphic assets, medium graphic assets or low graphic assets and, optionally, high, medium and low capability control data is selected. The method 300 then proceeds to step 330.

At step 330, the appropriate navigation and/or other assets are provided to the set top terminal via the physical and logical channels defined during session initialization. The set top terminal receiving the navigation and/or other assets presents these assets via the display device 140 such that a viewer may manipulate the input device 138 to select additional navigation screens, content for purchase or viewing and the like. The method 300 then proceeds to step 335.

At step 335, the service provider equipment 102 waits for a request from the STT. Upon receiving that request, the method 300 proceeds to step 340.

At step 340, the STT request is evaluated to determine if the request is for content or asset information. If the STT has requested CONTENT, then the method 300 proceeds to step 345. If the STT has requested ASSET data, then the method 300 proceeds to step 325, where the appropriate asset data is selected based upon the STT capability previously established.

At step 345, the requested content is provided to the STT. Optionally, in the case of an STT having a degraded or enhanced capability in terms of content (e.g., video and/or audio) processing, a respectively degraded or enhanced content stream is provided to the set top terminal. The method 300 then proceeds to step 350.

At step 350, a query is made as to whether the requested content is associated with asset data to be provided to the STT. If the query at step 350 is answered negatively, then the method 300 proceeds to step 335 to wait for the next STT request. If the query at step 350 is answered affirmatively, then the method 300 proceeds to step 325, where the appropriate asset data is selected based upon the STT capability previously established.

Various modifications to the above-described embodiments are contemplated by the inventor. For example, while the asset and content storage functions are depicted in FIG. 1 as being implemented using separate asset 125 and content 140 storage modules, a single storage module may be utilized to realize these functions. Moreover, within the context of an information distribution system having a plurality of information servers, these functions may be distributed over several information servers. For example, a central or asset server may be used to hold a "gold" copy of asset data that is periodically used to update asset data stored in other servers along with content data.

It should be noted that while the function of mapping data between content and asset data is performed with respect to the depicted mapping data 145-MD element of the session controller 145, the mapping data 145-MD may be stored in the single storage module or either of the asset and content storage modules. It is only necessary that the entity controlling the distribution of the content stream CONTENT and the asset stream ASSET utilize the mapping data 145-MD such that the asset stream appropriate to a requested content stream is provided to the transport processor 150 along with the requested content stream.

Although various embodiments which incorporate the teachings of the present invention have been shown and described in detail herein, those skilled in the art can readily devise many other varied embodiments that still incorporate these teachings.

What is claimed is:

1. Apparatus for adapting asset delivery within a heterogeneous multimedia video-on-demand distribution system having service provider equipment and at least one set top terminal, comprising:
   means for determining at the service provider equipment, for each set top terminal (STT) requesting a session for video content in the heterogeneous multimedia video-on-demand distribution system, a capability level of said STT and a capability level of the distribution network;
   means, coupled to the means for determining, for selecting, from a plurality of available versions of video content for provisioning at the STT and a plurality of available versions of navigation assets for navigating video content stored on said service provider equipment, one of said versions of video content and one of said versions of navigation assets for navigating the selected version of video content in response to a request for content from the STT, wherein the versions of video content and navigation assets are selected to be appropriate to said capability level of said STT; and
   means, coupled to the means for selecting, for mapping the selected navigation asset to said selected video content and providing the mapped navigation asset and video content to the STT in response to STT communications.

2. The apparatus of claim 1, wherein said capability level is defined in terms of at least one of a graphics processing capability, a command processing capability, a video processing capability, an audio processing capability, and a bandwidth capability.

3. The apparatus of claim 1, wherein said navigation assets are stored in a navigation asset database, each of said stored navigation assets being associated with at least one STT capability level.

4. The apparatus of claim 3, wherein said means for selecting comprises means for selecting, from said navigation asset database, a navigation asset having associated with it the capability level of the STT requiring said navigation asset.

5. The apparatus of claim 1, wherein an initial navigation asset provided to a STT comprises associated control information, said control information being indicative of related navigation assets within said navigation asset database having associated with them a capability level of said STT receiving said initial navigation asset.

6. The apparatus of claim 5, wherein said navigation assets comprises a plurality of applets including said video information, graphic information and control information that are provided to a set top terminal in response to user interaction with control information at said set top terminal indicative of a need for said stored applets.

7. The apparatus of claim 1, wherein said STT is configured to selectively tune, downconvert, and depacketize said video content and assets received via said transmission channels.

8. The apparatus of claim 1, further comprising:
   means for adapting said selected navigation asset version provided to said at least one set top terminal without reprocessing the selected video content, wherein said selected video content includes a plurality of interspersed NULL packets, such that at least a portion of said NULL packets are replaced by navigation asset packets associated with said selected video content version.

9. In an interactive multimedia video-on-demand distribution system including video-on-demand provider equipment coupled to subscriber equipment via a communications network, apparatus for adapting provided information to a set top terminal (STT) comprising:
   means for storing a plurality of versions of multimedia video-on-demand (VOD) information at the provider equipment, said versions of VOD information corresponding to differing capability levels associated with various types of STTs;
   means for determining at the service provider equipment, during a video-on-demand session initiation, a capability level of said STT, said determination being made by comparing STT configuration information to a database of STT capability information;

means, coupled to the means for determining, for selecting, from the versions of VOD information versions of video content and versions of navigation assets for navigating the video content, one of said versions of video content and one of said versions of navigation assets for navigating the selected version of video content in response to an STT request for content from the STT, wherein the versions of video content and navigation assets are selected to be appropriate to said capability level of said STT;

means, coupled to the means for selecting, for providing, to said STT in response to the STT request for information via at least one of a plurality of transmission channels, navigation assets adapted to said determined capability level of said STT, wherein said navigation assets are mapped to said selected video content, the selected navigation assets comprise a plurality of applets stored at said service provider equipment, said applets comprising video information, graphics information, and control information; and each of said set top terminals having a common video information processing architecture, one of a plurality of control architectures, and one of a plurality of graphics processing architectures, wherein said navigation assets are optimized to each of the possible STT capability levels to provide a plurality of respective navigation assets, each of said respective navigation assets having associated with it a respective STT capability level.

10. The apparatus of claim 9 wherein said provided information is optimized, either in real time or before storage, to each of the possible STT capability levels.

11. The apparatus of claim 9, wherein said determined capability level of said STT is defined in terms of at least one of a graphics processing capability, a command processing capability, a video processing capability, an audio processing capability, and a bandwidth capability.

12. The apparatus of claim 9 wherein said navigation assets including video information, graphics information and control information are provided by said information provider in response to requests from subscriber equipment.

13. The apparatus of claim 9 wherein said STT selectively tunes, downconverts, and depacketizes said navigation assets received via said transmission channels.

14. The apparatus of claim 9, further comprising:
means for interspersing NULL packets amongst each version of multimedia video-on-demand (VOD) information; and
means for adapting navigation assets provided to said STT without reprocessing requested video content, such that at least a portion of said NULL packets are replaced by navigation asset packets associated said requested video content version.

15. The apparatus of claim 9, wherein each applet includes links to other applets stored at said provider equipment.

16. The apparatus of claim 9, further comprising formatting said navigation assets and video content into MPEG packets.

* * * * *